United States Patent

Higbee et al.

[11] 4,164,336
[45] Aug. 14, 1979

[54] DUAL SPOOL POSITIVE DRIVE RETRACTOR

[75] Inventors: Wallace C. Higbee, Romeo; Robert J. Rumpf, Grosse Pointe, both of Mich.

[73] Assignee: The Firestone Tire & Rubber Company, Akron, Ohio

[21] Appl. No.: 896,928

[22] Filed: Apr. 17, 1978

[51] Int. Cl.$^2$ .................. A62B 35/02; B65H 75/48
[52] U.S. Cl. ........................ 242/107.4 A; 280/806
[58] Field of Search .............. 242/107.4 R, 107.4 E; 280/744–797; 297/388

[56] References Cited

U.S. PATENT DOCUMENTS

| | | | |
|---|---|---|---|
| 3,838,831 | 10/1974 | Bell | 242/107.4 A |
| 4,050,717 | 9/1977 | Yamada et al. | 280/747 X |
| 4,065,070 | 12/1977 | Pilarski et al. | 242/107.4 A |

Primary Examiner—Harvey C. Hornsby
Assistant Examiner—John M. Jillions
Attorney, Agent, or Firm—Miller, Morriss and Pappas

[57] ABSTRACT

A dual spool side by side retractor structure on a common frame wherein both spools are acted upon by a common lock pawl element, the lock pawl element engaging the ratchet teeth of one of the two spools and then being positively and guidably driven by the first spool to powered engagement with the other of said two spools and the guiding occurring as a consequence of cam surfaces directing the pawl-to-ratchet engagement. The pawl lock element is activated by a sensor element such as a pendulum structure. The pawl lock element is located between and beneath the two spools and upon tilting, the lock pawl element pivots toward guided interference with one set of ratchet teeth whereupon the moving spool drives the pawl element up a cam ramp to lockably engage the second spool. The pawl element is first displaced by an actuating sensor element and then the pawl element is displaced and driven laterally by the first spool in a direction transverse to the first displacement and up a ramp into contact with the retractor teeth of the second spool. The withdrawal and retraction directions of both spools are in an opposite sense to each other and the retractor spools are locked against any further withdrawal action when engaged by the pawl element. A spring in association with the cam-ramp restores the pawl element as retraction movement frees the pawl element.

5 Claims, 9 Drawing Figures

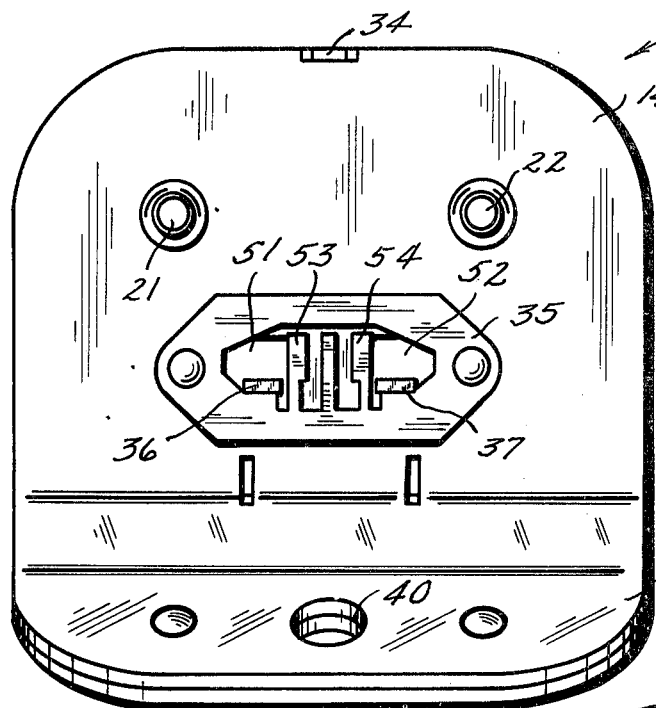
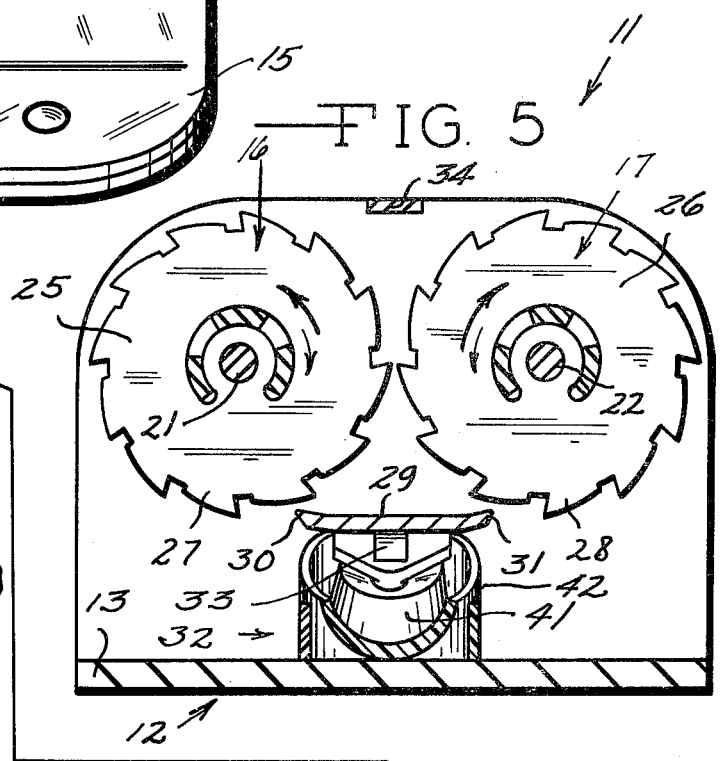
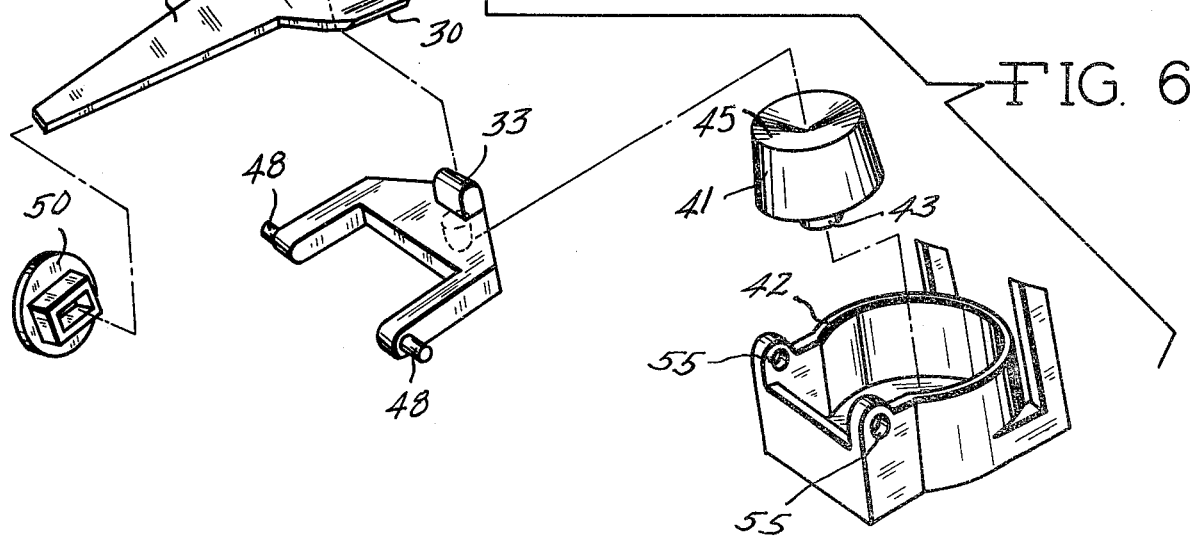

DUAL SPOOL POSITIVE DRIVE RETRACTOR

The present invention is a dual sppol side by side retractor structure on a common frame in which a common pawl element intermediate the two spools and supported by the frame is capable of being lifted guidably to engagement with the ratchet teeth of one of the spools and the pawl element is then powered guidably by the motion consequent to webbing withdrawal of the first engaged spool into guided locking engagement against the teeth of the ratchet of the second spool. The pawl element is initially displaced by a condition sensor such as a pendulum element reacting to inertial imbalance in the automobile as upon student deceleration, stopping, or impact from any direction acting in the plane of vehicle motion.

The principal object is to provide a seat belt retractor unit capable of serving two spools simultaneously or either of the two spools individually by means of a single common pawl element and a common sensor.

Another object is to provide a guided motion pawl element which, after primary engagement with one of the sets of retractor teeth, is positively powered toward locking the other set of retractor teeth if the other retractor spool is in use or simply locking the one first engaged spool if the second spool is not in use.

Another object is to teach the use of a single sensor for two spools in a compact manner to selectively and guidably lock one or both retractors when the sensor calls for locking against withdrawal of webbing and when unstressed a bias centers or relocates the pawl interference Other objects, including new economical construction in seat belt retractors, will be better appreciated as the description proceeds.

THE PRIOR ART

The prior art known to the applicants appear in the U.S. Letters Pat. No. 2,825,581 to Knight; 3,189,296 to Wrighton, et al; 4,050,717 to Yamada, et al; and 4,065,070 to Pilarski, et al. The closest art is the latter reference but the construction is intended to serve primarily where both spools are in use simultaneously and then the double edged pawl locks both spools upon tilting. By contrast, the present invention employs guided displacement of the pawl element after the sensor imparts a tilting action to a common three point supported pawl so that a powdered or positive lock-up occurs requiring minimal force from the sensor and relieving the sensor element of all lock stress once the first tooth engagement with the pawl element has occurred.

IN THE DRAWINGS

FIG. 4 is a projected elevation view on the line 4—4 of FIG. 1 and showing the cam structure in support of the pawl element at one end and with the spring centering plate registrably positioned over the cam opening.

FIG. 5 is a partial cross sectional end elevation view taken on the line 5—5 of FIG. 3 and indicating the two spools in parallel relation and rotating in opposite directions upon withdrawal of webbing therefrom and partially cut away to show the inertial sensor structure and the impingement of the pawl element on the frame pivot.

FIG. 6 is a partial exploded perspective view of the sensor structure, pawl, camming surfaces and the frame pivot support element for the pawl element.

GENERAL DESCRIPTION

In general, the dual spool side by side seat belt retractor structure of the present invention is of the type useful in vehicular travel where it is desired to allow the passenger or driver protected by webbing extended from the retractor structure to have substantial freedom of movement until an inertial imbalance is sensed, such as a sudden deceleration, impact from any angle or other disturbance causing a sensor to signal the prevention of further webbing withdrawal. Typically, seat belt retractors include a spring motor which applies a rewind bias to the webbing or harness withdrawn from the spools or drums. This is also true in the present construction and in this particular, the spools or drums are both separately biased to return and on withdrawal of webbing from the spools against the rewind spring motor the spools are separately operable but rotatable in opposite directions. The two spools or drums are thus journalled for movement independent of each other in a common frame. The webbing rolls up on the spools or drums when not needed and at all times the loose webbing is gathered in by the rewind spring bias. The spools or drums each have ratchet teeth which move with the drum and these are lockable to prevent withdrawal of webbing, as will be seen. The locking element is a common locking pawl which is pivotally supported by the frame at one end and which is supported by cam surfaces in the frame at the other end and biased to center under rest conditions. Thus, one end of the pawl element includes follower extensions which rest on the cam surfaces in the frame poising the pawl out of contact with the spools and beneath and between the two spools and the pawl element being axially rotatable on the pivotal support at the other side of the frame. Thus, the pawl rests on three points. A sensor in operable engagement with the pawl element and beneath the pawl element and supported by the frame is extendable to impart lift to the follower extension end of the pawl element while not disturbing the journalling of the pawl element at the end of the pawl opposite the follower extensions. Thus, a single sensor serves one or both spools.

On actuation of the sensor as by sudden deceleration, the pawl element is lifted and pivoted toward engagement of the pawl against the ratchet teeth of one of the spools. Engagement occurs with whichever spool is moving or contacted first by the dog portions of the pawl element. The ratchet impacts the pawl element applying a driving force as the spool and attached ratchet rotate in a withdrawal direction. This applies a force vector to the pawl element moving it up the ramp of the camming surface and toward interference engagement with the ratchet teeth of the second spool. Thus, a positive lock-up force is applied driving the pawl laterally toward lock-up with the ratchet teeth of the second spool.

SPECIFIC DESCRIPTION

Figure 1:
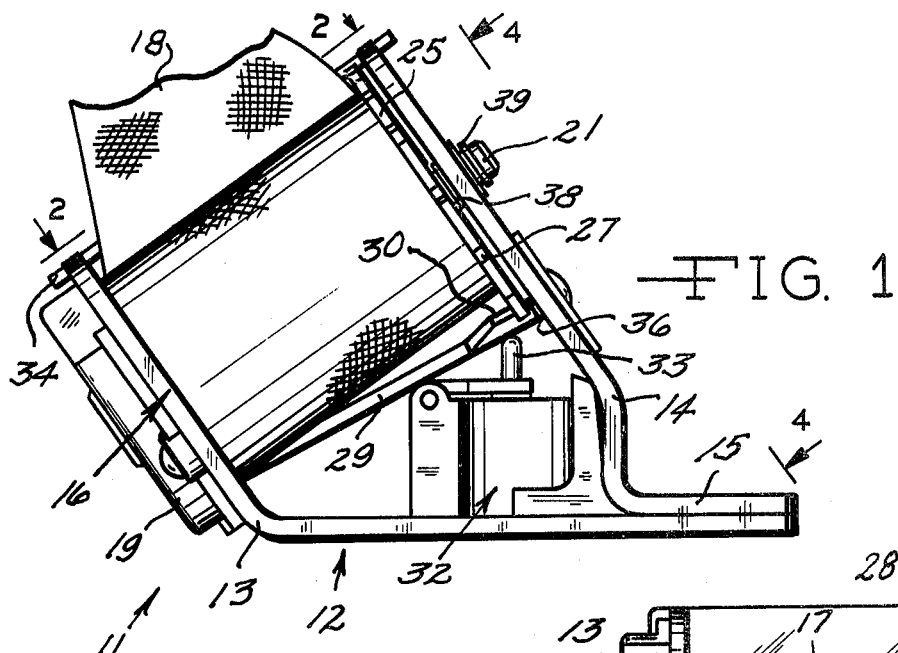
FIG. 1 is a side elevation view of a seat belt retractor structure in accord with the present invention and indicating the pawl element beneath the spools and with an inertial sensor element in operating engagement with the pawl element.

Referring to the drawings and with particularity to the FIG. 1 thereof, a seat belt retractor 11 is shown in accord with the present invention. The retractor 11 has a channel shaped frame 12. The frame 12 is in composite form and the plate 12 forms the web and one flange thereof and the plate 14 forms the other flange. The two plates 13 and 14 are welded where they are common at the mounting tab 15. The welding integrates the two plates 13 and 14 into the frame 12 and gives the frame 12 excellent structural and operational rigidity. The two flanges of the plates 13 and 14 support therebetween a pair of spools or drums 16 and 17. The two spools 16 and 17 are parallel and adjacent to each other so that in FIG. 1 the spool 17 is obscured from view. The spools 16 and 17 are provided with seat belt webbing 18 which is secured to the spools 16 and 17 at the inboard end and which is wound on the drums 16 and 17 by the action of spring motors 19 and 20 which are secured to shafts 21 and 22 of the drums 16 and 17, respectively, and are attached to the frame 12. The rewind retractor motors 19 and 20 are well known in the art and comprises a spirally wound flat spring attached at the inner end to the shafts 21 and 22, respectively. The outer end of the rewind spring is secured to the frame 12 or motor covers 23 and 24, respectively, and the rewind spring biases the respective drums 16 and 17 to rewind condition. As webbing 18 is withdrawn from the drums 16 and 17, the spiral springs of the motors 19 and 20 store energy increasing the return bias. Each drum or spool 16 and 17 includes a ratchet flange 25 and 26, respectively. These ratchet flanges 25 and 26 are secured to and rotate with the respective drums 16 and 17. The teeth 27 and 28 on the perimeter of the ratchet flanges 25 and 26, respectively, are oppositely oriented in the respective drums 16 and 17 and the rotation of the drums 16 and 17 is opposite from each other in withdrawal of webbing 18 and in retraction of webbing 18. A lock pawl element 29 is provided beneath and between the spools 16 and 17. Pawl dogs 30 and 31 extend symmetrically from one end of the pawl element 29 sized to registering engagement with the ratchet flanges 25 and 26, respectively. A sensor element 32 is provided in the frame 12 and beneath the pawl element 29. The sensor 32, reacting to emergency forces as, for example, sudden deceleration force of the vehicle in which the retractor 11 is mounted, includes a plunger 33 which displaceably engages the pawl element 29 and urges it into interference contact with the teeth 27 and 28 on the perimeter of the ratchet flanges 25 and 26. Spacer bars 34 supports the flanges 13 and 14 against collapse. The cam plate 35 on the flange plate 14 will be seen to cover the cam openings in the frame 12 in guide support to the extensions 36 and 37, respectively, from the pawl 29. Bushings 38 provide journal support for the shafts 21 and 22 in the frame 12 at both ends and the spring retainers or circlips 39 secure the shafts 21 and 22 against axial displacement. As shown in FIG. 1, the retractor frame 12 is leaned from the vertical position to accommodate a particular mounting in a vehicle frame as, for example, between front bucket seats so that webbing 18 feeds to left and right from spools 16 and 17, respectively, and across the laps of users. Other configurations and angles may be used to suit particular mounting positions.

Figure 2:
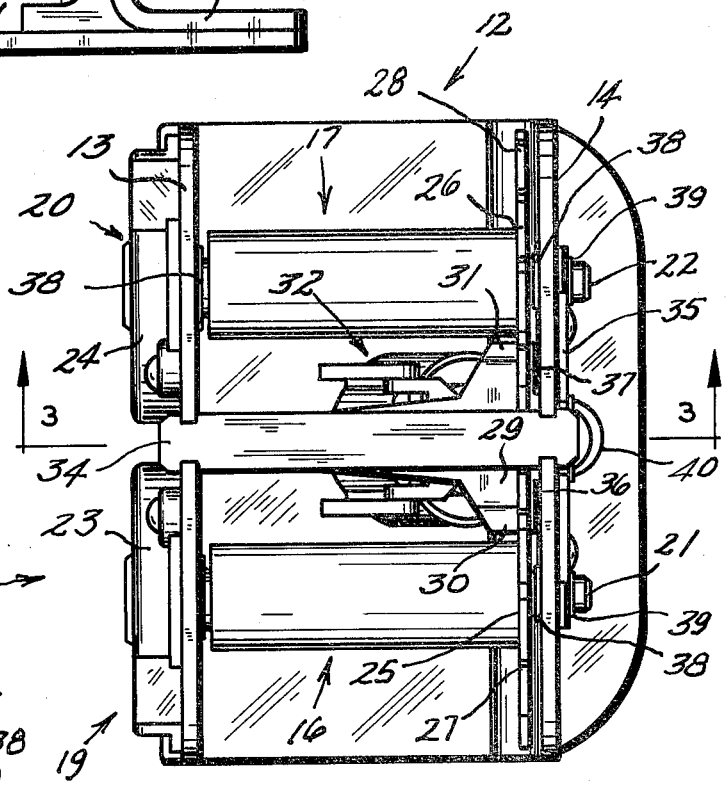
FIG. 2 is a top plan partial projected view taken on the line 2—2 of the FIG. 1 and with the seat belt webbing removed from the spools so that the side by side relation of the spools is appreciated and the common pawl, the common sensor, and the common frame are appreciated.

The construction of the retractor 11 can be better appreciated in the FIG. 2 where both spools 16 and 17 are visible with the webbing 18 removed therefrom so that the sensor 32 and pawl 29 are better related to the structure. In the FIG. 2, the opening 40 in the mounting tab 15 provides a means for securing the retractor 11 at a selected point in a vehicle to a vehicle frame member in position to serve the webbing 18 for selected encirclement of drivers and passengers with seat belt harness. Not seen, is terminal hardware such as tongue plates, buckles or connecting harness since the retractors 11 may serve in a wide variety of harness situations without departure from the spirit of the invention. Ideally, the retractor 11 is suited to serve both passenger and driver, one spool 16 feeding toward encirclement of one and the spool 17 feeding toward encirclement of the other.

Figure 3:
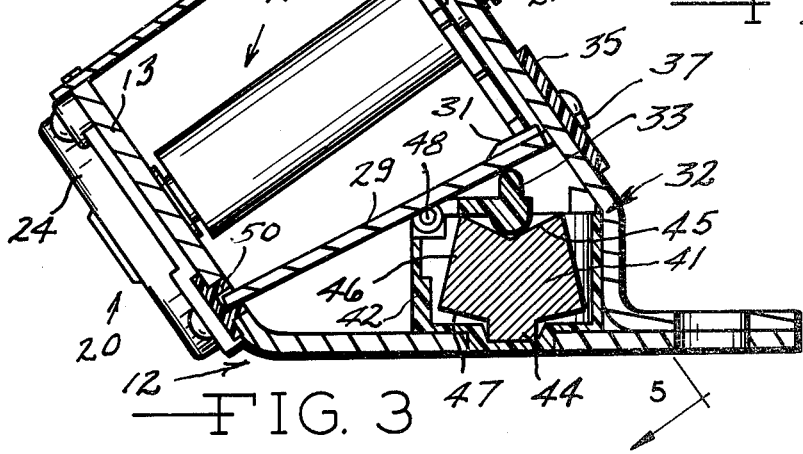
FIG. 3 is a side elevation section view taken on the line 3—3 of the FIG. 2 and indicating the pawl element with its teeth in a tiltable path toward interference engagement with the ratchet teeth of the spools.

The cross section of FIG. 3 shows the sensor 32 as a vehicle sensitive sensor comprising a pendulum element 41 tiltable in a cage or housing 42 and acting against the plunger 33 which, in turn, is in contact with the pawl element 29. The pendulum element 41 has a flat cylindrical base 43 which rests in a detent socket 44 secured to the frame 12. The top of the pendulum 41 includes a conical depression 45 against which the follower or plunger 33 impinges and centers so long as the pendulum 41 is in the vertical position. The side wall 46 of the pendulum is conic extending downwardly and stopping short of contact with the cage 42. A conic relief 47 is also provided at the bottom converging toward the flat cylindrical base 43. The plunger 33 is pivotally connected to the cage or housing 42 and the pivot (clevis) pin 48 is shown through mating openings in the housing 42. Upon sudden deceleration of the vehicle or upon impact of the vehicle, the pendulum 41 tilts from the vertical and as it does so the plunger 33 is urged upward by the displacement of the pendulum 41 and the plunger 33 follows or climbs the walls of the conic projection as well as following the lift of the tilt at the base 43. This lifts the pawl element 29 toward engagement of dogs 30 and 31 with the teeth 27 and 28 of the ratchet flanges 25 and 26, respectively, with corresponding movement of the pawl extensions 36 and 37 and as will be seen, some axial rotation of the pawl 29 in the foot bushing 50 in the flange plate 13 of the frame 12. The function of this movement occurs as a consequence of cam action between cam openings and pawl extensions 36 and 37.

Centering resilient control is achieved with the cam cover 35, as will be seen.

In FIG. 4 the flange plate 14 is shown with the cam cover 35 riveted registrably over the cam openings 51 and 52. The pawl extensions 36 and 37 are in rest position in the cam openings and againt the cam plate 35. Spring finger elements 53 and 54 space the extensions 36 and 37 apart in a resilient manner allowing for lateral displacement of the extensions in left and right directions, as shown, while climbing the ramped surfaces of the cam openings 51 and 52, first by sensor imposed movement of the plunger 33 (not seen) and then the laterally imposed displacement of the pawl 29 when driven by one of the two spools first engaged by the pawl dogs 30 and 31 of the pawl 29 against the teeth 27 and 28 of the ratchet flanges 25 and 26, respectively. The positive drive occurs as the webbing 18 is impelled by the movement of the body of the user in a withdrawal direction from the spools 16 and 17. Then, as will be seen, the second to lock dog 30 or 31 is lifted and guided by movement of the pawl 29 on the ramp surfaces of the cam openings 51 and 52 to lock-up of both spools 16 and 17 against any further withdrawal. The driving engagement of dogs 30 and 31 to the teeth 27 and 28 avoids any "bounce" tendencies and is effective as a lock against webbing withdrawal in one or both spools 16 and 17. In the cut-away FIG. 5, the directions of rotation of each independent spool 16 and 17 in withdrawal are shown in large curvalinear arrows and the retraction directions are shown in lighter and smaller arrows superimposed on the ratchet flanges 25 and 26. The sensor 32 beneath and between the two spools 16 and 17 is shown and the plunger 33 is seen engaged against the pendulum 41 and the pawl 29. The pawl lock dogs 30 and 31, respectively, upon lift, are seen as engageable with the ratchet teeth 27 and 28.

The exploded view of FIG. 6 shows the assembly interrelationship of the generally triangular pawl 29 to pivotal follower plunger 33 while being axially supported in the foot pivot 50 and with the pawl extensions 36 and 37 in the cam openings 51 and 52. The foot pivot 50 is secured in the frame 12 and provides a means for support and pivoting of the pawl 29 on the longitudinal axis of the pawl 29 while accommodating lift of the pawl extensions 36 and 37 which rest in the cam openings 51 and 52, respectively, in the flange plate 14 of frame 12. The cage or housing 42 of the sensor 32 is clearly related functionally and the pendulum 41 is locatable axially within the cage 42 and is displaceable from that position as previously indicated. The pivot openings 55 receive the pivot pin or clevis pin 48 in pivotal support of plunger 33.

Figure 7:
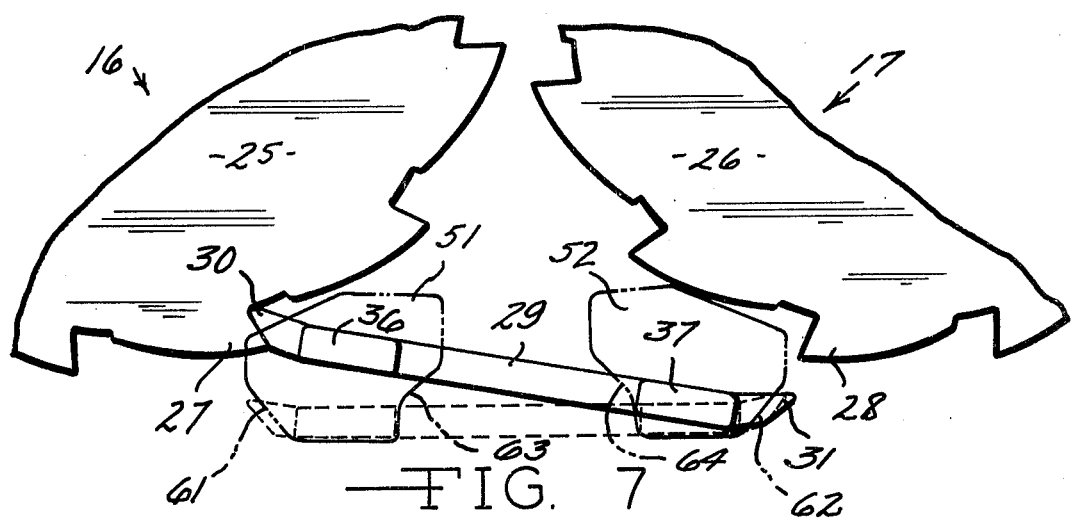
FIG. 7 is a composite somewhat schematic end elevation view indicating the tilt and lift of the pawl element into interference engagement with one of the two spools at the ratchet teeth thereof and in respect to the fixed cam paths. The rest position of the pawl element is in phantom line.
Figure 8:
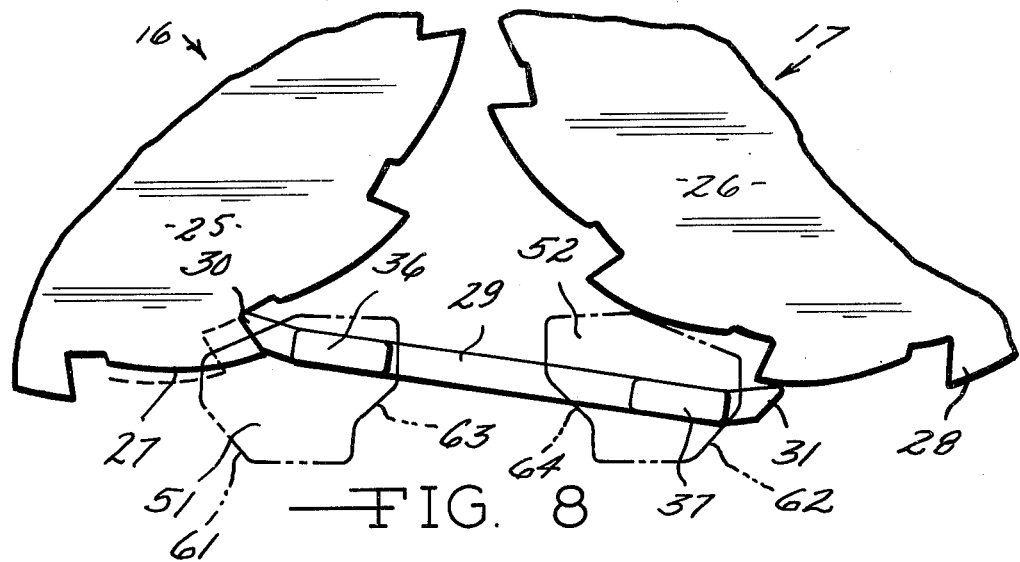
FIG. 8 is a composite somewhat schematic end elevation view as seen in FIG. 7 but after the ratchet teeth of one spool have driven the engaged pawl element laterally, guided on the cam or ramp surfaces to lift engagement with the teeth of the other of the spools. The cam path of controlled movement of the pawl element is defined by the light broken lines in the two closed opposed patterns.
Figure 9:
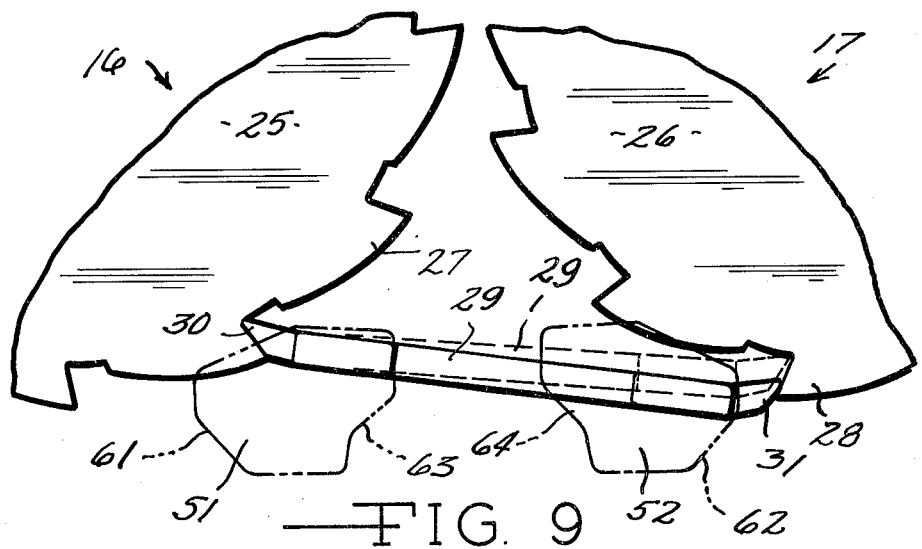
FIG. 9 is a composite somewhat schematic end elevation view as seen in FIGS. 7 and 8 and showing the full lock engagement of the guidably driven pawl against a tooth of the ratchet of the second spool.

FIGS. 7, 8 and 9 illustrate the guiding of the pawl element 29 by the ramped cam surfaces 61 and 62 and the relief surfaces 63 and 64 in the cam openings 51 and 52. The guidance occurs when the pawl element 29 is lifted by the sensor 32 toward engagement with either the teeth 27 on flange 25 or the teeth 28 on flange 26. Since the generally triangular pawl element 29 is pivotal at is lowermost apex in the foot bushing 50, the dogs 30 and 31 are tiltable, as shown, on rising and one dog 30 or 31 engages the respective registering teeth 27 or 28. The withdrawal movement of the contacted flange 25, as shown, drives the pawl element 29 laterally and its extension 37 engages the ramp 62 in the cam opening 52 and the non-engaged side of the pawl rises along that ramp 62 to the periphery of the flange 26 as seen in the FIG. 8. This locks the dog 30 of the pawl 29 firmly in the teeth 27 and prevents further withdrawal of the webbing 18 from the spool 16. If the spool 17 is also in use so that withdrawal stresses are applied by reason of stress on the webbing 18, then the spool or drum 17 rotates until the dog 31 climbs against a tooth 28 as seen in FIG. 9 and a dynamic lock-up of both drums 16 and 17 occurs in accord with the guidance by the cam surfaces 61, 62, 63 and 64 as indicated in FIGS. 7-9, inclusive. The ramp 63 and 64, respectively, allow lateral displacement toward the center of the openings 51 and 52 and thereafter guidably restore the starting condition indicated in FIG. 7 where pawl 29 is shown in phantom line. In FIG. 9 the phantom line shows the final lift of the pawl 29 into the pocket at the root of tooth 28. While initial lift shows a tilt toward engagement of dog 30 with teeth 27, chance may result in the initial rise of dog 31 to contact teeth 28 in which case the dynamic lockup proceeds oppositely as shown in FIGS. 7-9, inclusive. Upon restoration of normality and the freeing of the web stress from the spools 16 and 17, the spring centering fingers 53 and 54 of cam cover 35 urge the pawl extensions 36 and 37 to center and fall back into the base position shown in FIG. 4 and free of contact of the pawl 29 with teeth 27 and 28.

In operation the dual spool retractors in accord with the present invention are simplified by requiring fewer operating parts and in reducing the number of ratchet flanges formerly required. Also, the structure described achieves a dynamic or driven lock-up without imposing heavy stress upon the sensor elements, the plunger elements and the pawl foot pivot. This allows these elements to be manufactured as by injection molding of plastic material having good dimensional stability and parts reproducibility, though having less strength than, say, the steel pawl elements, ratchet elements and frame structure. The cam cover 35 generally registers with the ramp surfaces in avoidance of noise and assuring quiet during movement of the pawl 29. The cam cover 35 is molded in a tough and durable plastic having good lubricity and dimensional stability such as HYTREL, a thermoplastic polymer of the E. I. duPont de Nemours & Co., Inc. The housing or cage 42 of the sensor 32 may be made from plastic material as by injection molding and is easily heat riveted or otherwise attached to the frame 12 in position beneath and between the oppositely rotating drums 16 and 17 and beneath the pawl element 29.

The retractor of the present invention finds particular utility between bucket front seats in sports type vehicles in control of selected harness of both the types requiring physical attachment and the type being manipulated by the entry of the user into the seat and vehicle and designated "passive" restraints.

Having thus disclosed our invention and its uses, those skilled in the art will readily appreciate modifications, changes and improvements within the skill of the art and such modifications, changes and improvements are intended to be included within the spirit of the present invention limited only by the scope of our hereinafter appended claims.

We claim:

1. A dual spool retractor structure comprising:
   a frame;
   a pair of spaced-apart parallel adjacent spools having seat belt webbing wound thereon and having rewind motors operably connected thereto and journalled in said frame, each said spool having ratchet flanges with ratchet teeth lockable in opposite directions of rotation;

a pawl element in said frame beneath and between said spools and having a pair of extensions at one end, said extensions displaceably supported in a pair of cam openings defined in said frame, said cam openings configured for guiding lift and displacement of said pawl toward inteference engagement with said ratchet teeth; and a sensor secured to said frame and beneath said pawl element operably contacting said pawl and selectively movable to lift said pawl guidably toward interference engagement with movable of said ratchet teeth of one of said spools.

2. In the structure of claim 1 wherein said frame is channel shaped and said spools are journalled between the flanges thereof.

3. In the structure of claim 1 wherein said cam openings include spring centering means restoring said pawl to an initial rest position.

4. A dual spool retractor structure comprising:

a frame;

a pair of spaced-apart parallel adjacent spools having seat belt webbing wound thereon and having rewind motors operably connected thereto and journalled in said frame, each said spool having ratchet flanges with ratchet teeth lockable in opposite directions of rotation;

a pawl element in said frame beneath and between said spools and having a pair of extensions, said extensions displaceably supported in a pair of cam openings defined in said frame at one side thereof, said cam openings guiding lift and displacement of said pawl toward interference engagement within said ratchet teeth;

spring means attached to said frame and extending into said cam openings applying a return bias to said pawl element; and a sensor secured to said frame and beneath said pawl element operably contacting said pawl and selectively movable to lift said pawl guidably toward interference engagement with said ratchet teeth of one of said spools.

5. In a dual spool seat belt retractor having a common frame of the channel type in which the spools are positioned in side by side parallel relation journalled in the flanges of said frame and each spool is operably connected to a rewind motor, the withdrawal and rewind directions of each spool being opposite to each other and each spool including a ratchet flange with teeth rotating with said spool, the combination comprising:

a pawl element beneath and between the two spools and having tooth engaging portions on each side of said pawl element in an interference path with said ratchet teeth and having a pair of longitudinal extensions at one end and a pivot at the other end in said frame;

pawl support cam openings in spaced-apart relation in one of the flanges of said frame nestably receiving said extensions of said pawl element in a first rest position for said pawl, each of said openings configured to include a lift surface and a lateral movement portion;

spring means urging said pawl into said first rest position; and a sensor element beneath said pawl and operably connected to said pawl intermediate said extensions to lift the pawl from said first position and to interference engagement with said ratchet teeth and said pawl thereupon shifting laterally in said cam openings and against said spring means to guidably and lockably engage both of said spools at the ratchet teeth thereof.

* * * * *

UNITED STATES PATENT OFFICE
CERTIFICATE OF CORRECTION

Patent No. 4,164,336    Dated 1979 August 14

Inventor(s) Wallace C. Higbee and Robert J. Rumpf

It is certified that error appears in the above-identified patent and that said Letters Patent are hereby corrected as shown below:

Column 1, line 1, "sppol" should read --- spool ---

Column 1, line 15, "student" should read --- sudden ---

Column 1, line 33, "interference" should read --- element ---

Column 1, line 33, insert a period [.] after "element"

Column 3, line 30, change "12" to read --- 13 ---

Column 3, line 46, "comprises" should read --- comprise ---

Column 4, line 6, "bars" should read --- bar ---

UNITED STATES PATENT OFFICE
CERTIFICATE OF CORRECTION

Patent No. 4,164,336        Dated 1979 August 14

Inventor(s) Wallace C. Higbee and Robert J. Rumpf

It is certified that error appears in the above-identified patent and that said Letters Patent are hereby corrected as shown below:

Column 5, line 6, "againt" should read --- against ---

Column 5, line 60, "is" should read --- its ---

Column 7, line 9, "inteference" should read --- interference ---

Column 7, line 20, delete "said" before "cam"

Signed and Sealed this

Twenty-fifth Day of December 1979

[SEAL]

Attest:

Attesting Officer

SIDNEY A. DIAMOND

Commissioner of Patents and Trademarks